United States Patent [19]

Laurenz

[11] 4,243,137
[45] Jan. 6, 1981

[54] BARN OR PIT FLOOR SCRAPER ASSEMBLY AND DRIVE MEANS THEREFOR

[75] Inventor: Frank R. Laurenz, Eagle Butte, S. Dak.

[73] Assignee: Agricultural Research and Development Inc., Eagle Butte, S. Dak.

[21] Appl. No.: 11,908

[22] Filed: Feb. 13, 1979

Related U.S. Application Data

[63] Continuation of Ser. No. 807,663, Jun. 17, 1977, abandoned.

[51] Int. Cl.³ .............................................. B65G 27/00
[52] U.S. Cl. ..................................... 198/748; 198/749
[58] Field of Search ............... 198/748, 749, 725, 734, 198/856, 323, 743, 497, 499; 15/256.5, 256.51, 256.53, 236 B, 250.41, 245; 242/47.08, 47.09

[56] References Cited

U.S. PATENT DOCUMENTS

| | | | |
|---|---|---|---|
| 629,851 | 8/1899 | Glen | 15/245 |
| 2,071,813 | 2/1937 | Bouton et al. | 198/323 X |
| 2,552,743 | 5/1951 | Simpson | 198/748 X |
| 3,458,029 | 7/1969 | Allen et al. | 198/748 X |

FOREIGN PATENT DOCUMENTS

| | | | |
|---|---|---|---|
| 219101 | 9/1958 | Australia | 242/47.09 |
| 22464 | of 1901 | United Kingdom | 242/47.09 |

*Primary Examiner*—Johnny D. Cherry
*Assistant Examiner*—Douglas D. Watts
*Attorney, Agent, or Firm*—Larson, Taylor and Hinds

[57] ABSTRACT

A T-shaped scraper assembly is operatively connected to a drive unit via a cable assembly and is adapted to be pulled along the floor in one direction thus scraping manure or debris from the floor, and in the opposite direction to return the scraper assembly to the starting position. When moving in the non-scraping direction, means are provided to elevate the scraper blades slightly above the floor level. The scraper blades are floatably mounted vertically thus allowing them to follow the floor contours within limits and the width is adjustable within limits also. The drive unit includes a resilient or nonmetal main, grooved cable pulley and a resilient or nonmetal idler pulley situated at an angle so that the cable engaging around these pulleys runs relatively freely aligned in the cable grooves. The angling of the idler pulley relative to the main drive pulley reduces side friction between the cable and the grooves and between the cable portions where same cross one another. Means are provided to sense an obstruction and automatically shut off the mechanism.

13 Claims, 13 Drawing Figures

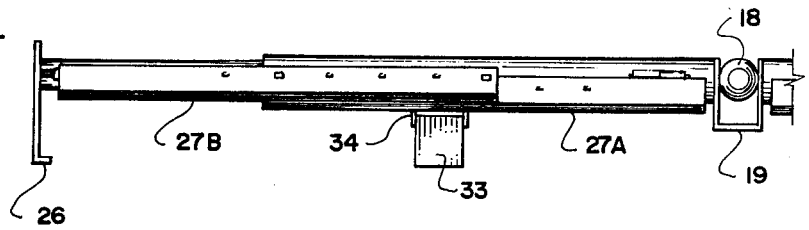
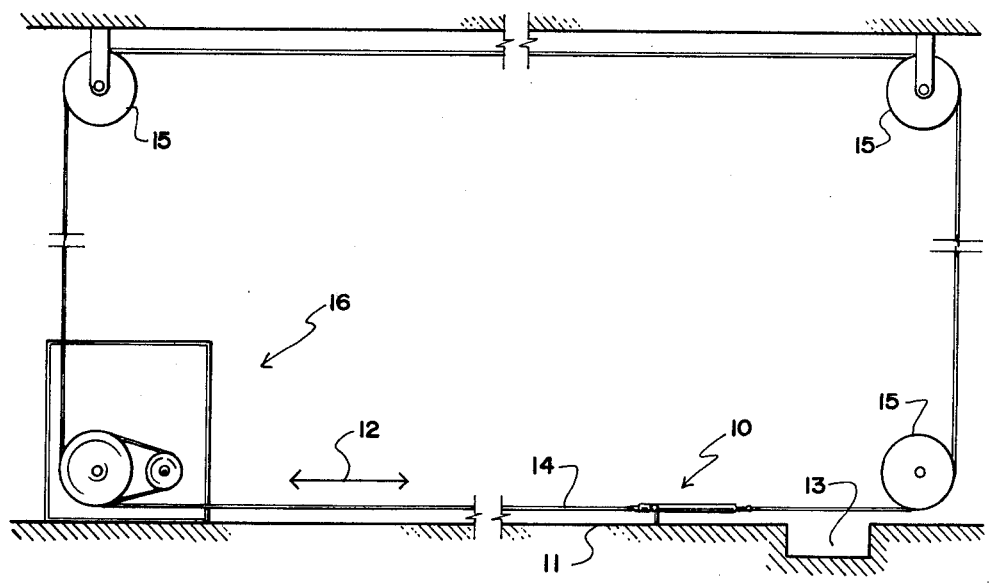
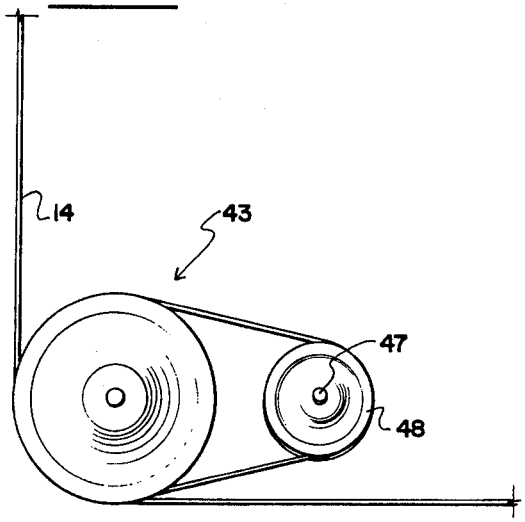
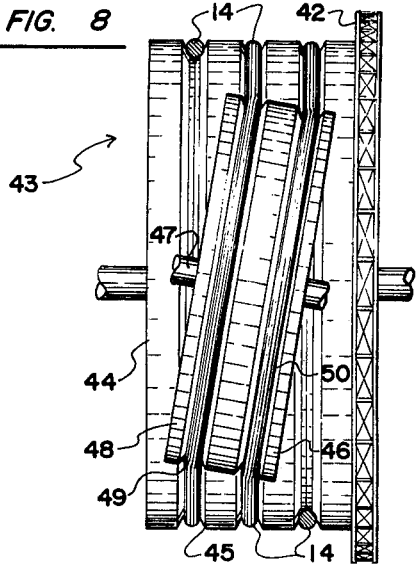

BARN OR PIT FLOOR SCRAPER ASSEMBLY AND DRIVE MEANS THEREFOR

This is a continuation of application Ser. No. 807,663, filed June 17, 1977, now abandoned.

BACKGROUND OF THE INVENTION

This invention relates to new and useful improvements in scraper assemblies and drive means therefor adapted to scrape manure and the like from barn or pit floors.

There are many such devices, but all of them require a relatively flat floor surface in order to clean efficiently. If the floor surface is slightly uneven, as often occurs in practice, the conventional scraper assemblies do not scrape the floor effectively. Furthermore, conventional scraper assemblies do not incorporate means to automatically close down the drive mechanism if an obstruction such as an animal or equipment, is encountered by the scraper assembly.

Conventional drives for scraper assemblies normally incorporate a winching mechanism with an endless chain or cable but due to the lack of a safety close down on the drive mechanism, should an obstruction be encountered, cause damage to scraper and drive and/or animal or equipment accidently obstructing the path of the scraper.

Another disadvantage of conventional scraper assemblies is that on drives incorporating a double winch arrangement the idlers are not angled in relationship to the drive pulley which forces the cable sideways to align with the grooves of idler and drive pulleys which accelerates cable and pulley wear.

Conventional drive assemblies using rounded metal grooves in metal pulleys instead of the V-grooves or U-grooves of resilient nonmetal pulleys must use excessive tension to achieve the desired pull without slippage which accelerates cable and drum wear.

SUMMARY OF THE INVENTION

The present invention overcomes these disadvantages by providing a scraper system for barn or pit floors and the like comprising in combination a scraper assembly, a source of power for said scraper assembly and means operatively connecting said source of power to said scraper assembly to move said scraper assembly back and forth across said floor, said scraper assembly including a hitch component, a frame extending outwardly on each side of said component and a scraper blade component hingedly mounted to said frame and means to mount said scraper blade component for flexible vertical vertical movement relative to said frame, within limits.

Another object of the present invention is to provide a device of the character herewithin described in which the width of the scraper blade assembly can be adjustable within limits to suit the size of alley within which it is being used.

A still further object of the invention is to provide a device of the character herewithin described in which the scraper blades and frame may be perpendicular to the tongue or hitch, or alternatively, may be V-shaped in the direction of the movement of the manure or debris, depending upon design parameters.

A still further object of the invention is to provide a device of the character herewithin described in which the source of power includes an angled idler pulley in front of the main drive pulley so that the cable may be entrained around the idler pulley to form an offset loop or a figure eight configuration which increases tremendously, the gripping effect of the cable on the drive drum. Although double drum scraper drives are well known, it is not believed that the angled pulley configuration has been used heretofore which reduces the frictional engagement of the cable with the sides of the grooves and eliminates any binding effect between opposite runs of cable extending between the drive pulley and the idler pulley.

Still another object of the invention is to provide a device of the character herewithin described in which both the surfaces of the drive pulley and the idler pulley assembly are formed from a resilient nonmetalic material having V-grooves or U-grooves therein which materially increases the gripping relationship between the cable and the drive pulley assembly.

Yet another object of the invention is to provide a device of the character herewithin described which includes a sensing device enabling an emergency stop or shut down of the scraper drive to occur, should it contact an obstruction during the traverse or when it reaches the end of a run.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 5 is a fragmentary view similar to FIG. 4 but showing the blade in the non-scraping position.

FIG. 6 is a schematic view showing one layout of the system with the cable secured to either end of the scraper hitch.

FIG. 7 is a schematic fragmentary view of the drive and idler pulley assemblies.

FIG. 8 is an end view of FIG. 7.

In the drawings like characters of reference indicate corresponding parts in the different figures.

DETAILED DESCRIPTION

Figure 1:
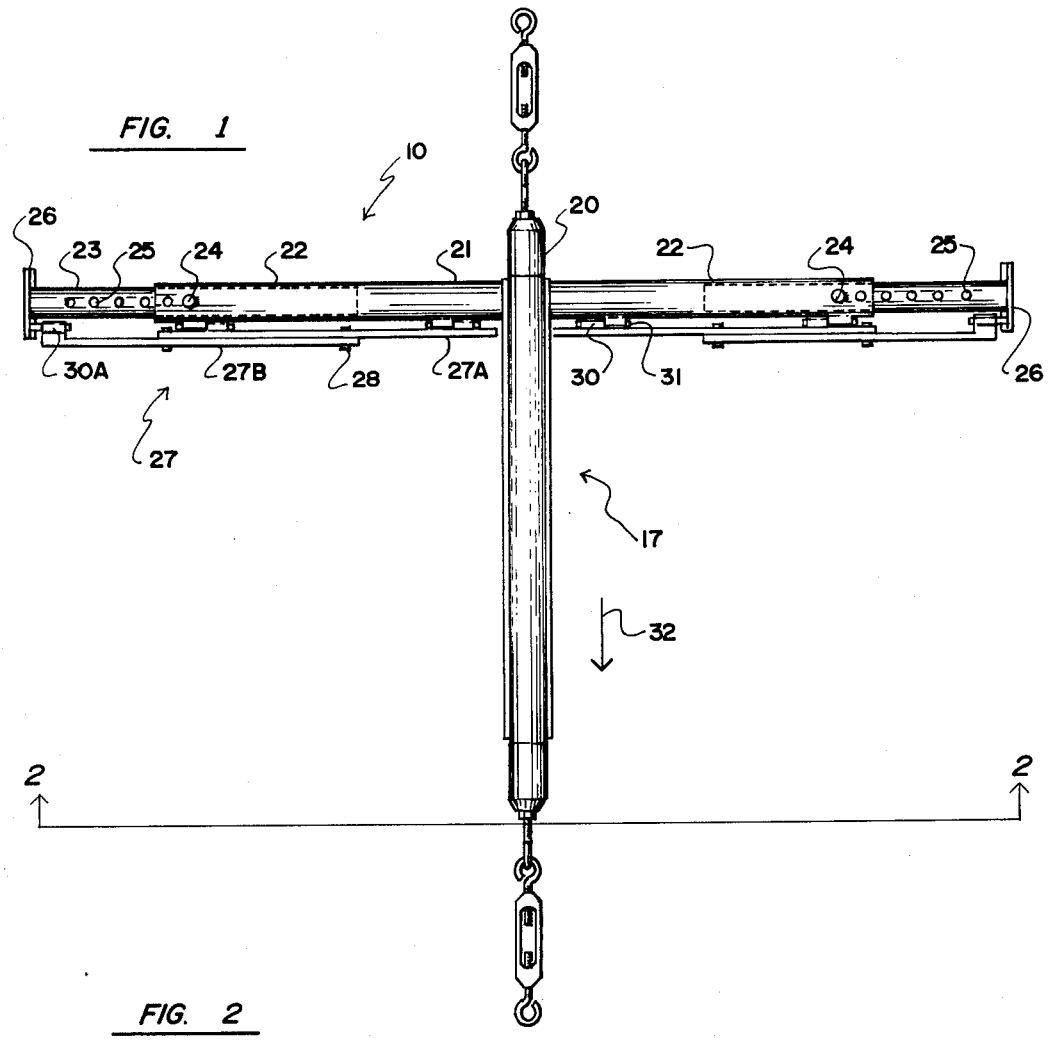
FIG. 1 is a top plan view of the scraper assembly per se.
Figure 2:
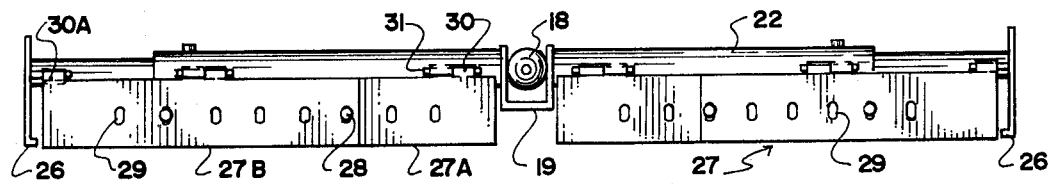
FIG. 2 is a view from the end of FIG. 1 substantially along the line 2—2 of FIG. 1.

Proceeding therefore to describe the invention in detail, reference should first be made to FIG. 6 which shows schematically, one embodiment of the device. The scraper assembly is collectively designated 10 and is situated upon the floor 11 of a barn or pit and is adapted to be moved in a back and forth movement as indicated by double-headed arrow 12, to clear manure and/or debris into a manure pit 13 situated adjacent one end of the floor. A cable 14 is secured by one end thereof to the scraper assembly 10 and extends around guide pulleys 15, to a source of power and drive unit collectively designated 16 whereupon it extends to the front of the scraper unit so that the scraper unit can be moved back and forth as aforesaid.

In detail, and describing the scraper assembly first, a hitch component is provided collectively designated 17. In this embodiment, it includes a longitudinally extending tube 18 nested within a U-shaped channel member 19 which acts as a skid upon which the scraper assembly slides across the floor. The tube 18 is held within the U-shaped channel 19 by means of welding.

Adjacent the front end 20 of the hitch, a tubular frame 21 is provided and extends upon either side of the hitch 17, substantially at right angles thereto thus providing a substantially T-shaped device when viewed in plan.

In this embodiment, the frame 21 consists of main tubular members 22 having secondary tubular members 23 slidably engageable therein and being selectively held in relationship to the main tubes 22, by means of nut and bolt assemblies 24 extending through apertures 25 formed through the parts 22 and 23.

Floor engaging skids 26 are formed on the ends of the tubular members 23 and support the scraper assembly upon the floor together with the U-shaped hitch member portion 19.

A scraper blade assembly is provided collectively designated 27, said scraper blade assembly including at least two portions 27A and 27B partially overlapping one with the other and being detachably secured together by means of nut and bolt assemblies 28.

A plurality of vertically situated closed ended slots 29 are formed within the blade portions 27A and 27B and the nut and bolt assemblies 28 engaged through matching pairs of these slots at the overlapping portion 29 of the blades. These nut and bolt assemblies are relatively loose so that the individual portions 27A and 27B may float up and down relative to the frame 22, so that they follow substantially, the contour of the floor upon which the device is being used.

These blade portions 27A and 27B are connected by loose hinges 30, to the frame 22, by means of hinge pins 31. The hinge portions 30 are situated alternately on the frame 22 and on the scraper blade portions 27A and 27B and these hinge portions are oval in cross-sectional configuration so that a certain vertical floating movement is also provided by the connection of the blade portions to the frame.

An end hinge attachment 30A extends between the outermost end of the blade portion 27B and the skid 26 and once again this connection is relatively loose to permit the desired floating action of the blade portions.

When in use and being moved in the scraping mode or direction indicated by arrow 32, the blades engage against the frame so that they are situated substantially at right angles to the floor surface and will scrape manure and debris in the direction of arrow 32.

As the scraper travels along with the blades maintaining relatively close contact with the floor, the blades are able to form a seal of manure that will carry along liquids. Although the blades are shown situated substantially perpendicular to the hitch, they may be designed so that they are V-shaped in the direction of movement of the manure.

The width of the blades is also adjustable in conjunction with the width of the frame due to the overlapping relationship of the two blade sections and the bolt together thereof by means of the nut and bolt assemblies 28. In other words, the blades are adjusted at the same time as the width of the frame is adjusted.

Figure 3:
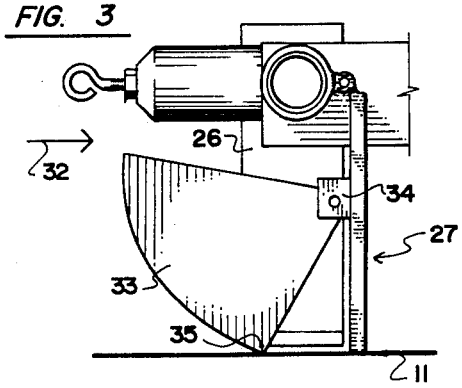
FIG. 3 is a fragmentary side elevation of FIG. 1 with the scraper blade in the scraping position.
Figure 4:
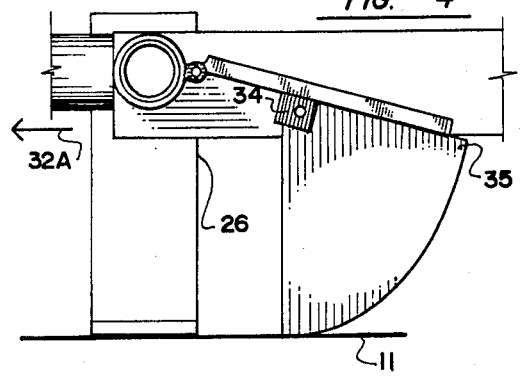
FIG. 4 is a view similar to FIG. 3, but showing the scraper blade in the elevated or non-scraping position.

When the scraper assembly is returned in a direction opposite to arrow 32, it is desirable that the blades be in a non-scraping mode to eliminate unnecessary back and fourth movement of any manure or debris and in this connection, reference should be made to FIGS. 3, 4 and 5.

Situated substantially centrally of the blade assemblies, is a substantially triangular cam component 33 pivotally secured between brackets 34, to the rear of the blade component or assembly 27 and when it is moving in the direction of arrow 32 as shown in FIG. 3, the floor engaging portion 35, scraps along the floor 11 so that the cam freely pivots behind the blade and does not affect the operation thereof.

However, when the movement is reversed to the position indicated by arrow 32A in FIG. 4, the floor engaging end 35 of the cam 33 digs into the floor thus rotating the cam and lifting the blade to the substantially horizontal position shown in FIG. 4 so that it is now in the non-scraping position or mode. Under these circumstances, the entire scraper assembly is travelling on the central hitch channel 19 and the two cams 33 which have rolled over due to the change in direction.

The source of power is contained within a substantially cubicle framework 36 containing a motor such as an electric motor 37 connected to a reduction gear 38 and including a drive shaft 39 extending from the reduction gear assembly 38.

A relatively small sprocket 40 is secured to shaft 39 and an endless chain 41 extends around this sprocket and around a relatively large sprocket 42 connected to a drive pulley assembly collectively designated 43.

This drive pulley assembly 43 consists of a drum portion 44, the surface at least of which is resilient or non-metalic and which is provided with one or more V-grooves 45 extending around the periphery thereof.

An idler pulley assembly 46 is mounted upon shaft 47 and is also provided with a resilient or nonmetallic surface 48 containing V-grooves 49 as clearly shown in FIG. 8.

A flexible cable 50 is routed around the grooves 45 and 49 either in a double knot or figure eight configuration as desired thus giving increasing traction.

It will be noted in FIG. 8 that the idler drum component 48 is situated in a plane at an angle to the main drive drum component 43 thus giving greatly reduced wear upon the cable and the sides of the drum grooves.

By reversing the angle of the idler drum component 48, opposite to that shown in FIG. 8, a figure eight configuration of the cable may be provided around the drums and under these circumstances, the relationship between the drive pulley assembly 43 and the idler drum 48 is such that the crossed cables do not interfere with one another thus reducing considerably the power required and the wear on the cable and the drum grooves.

It should be appreciated that when operating, this cable at times runs under extremely heavy tension and any reduction of misalignment stress obviously improves the efficiency of the device and reduces wear upon cable and drums.

As mentioned previously in connection with FIG. 6, the cable extends from the drive component 16, substantially horizontally to be connected to the hitch 17 and is routed around the corner pulleys 15 to be engaged at the opposite end of the hitch 17 as clearly illustrated.

Figure 9:
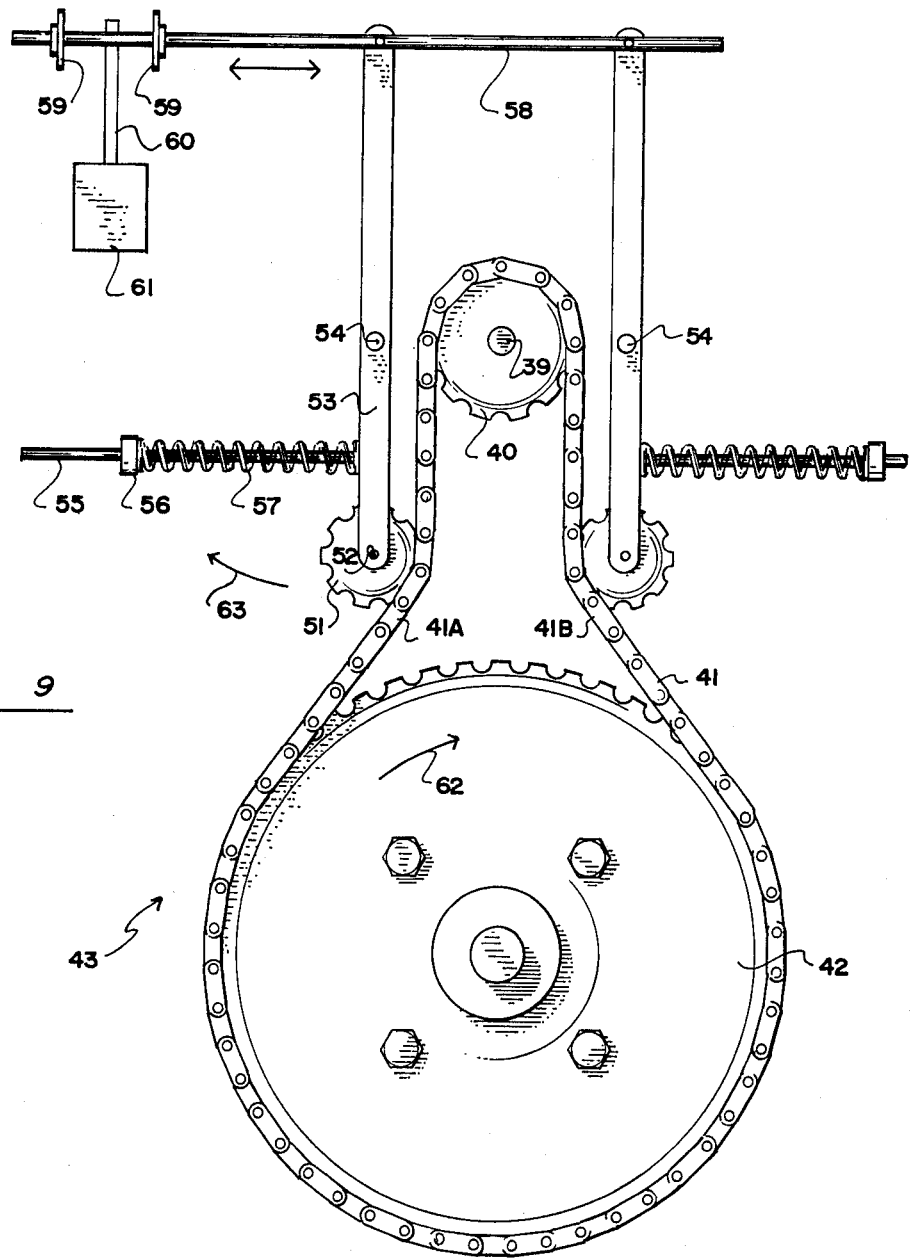
FIG. 9 is a schematic top plan view showing the drive assembly together with the automatic cut-off device.
Figure 10:
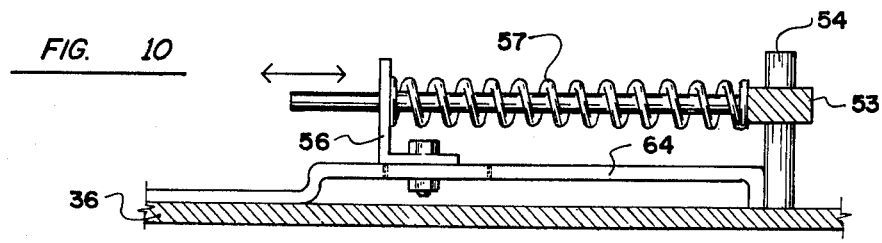
FIG. 10 is a fragmentary front elevation showing one method of adjusting the spring tension of the idler pulley assemblies.
Figure 11:
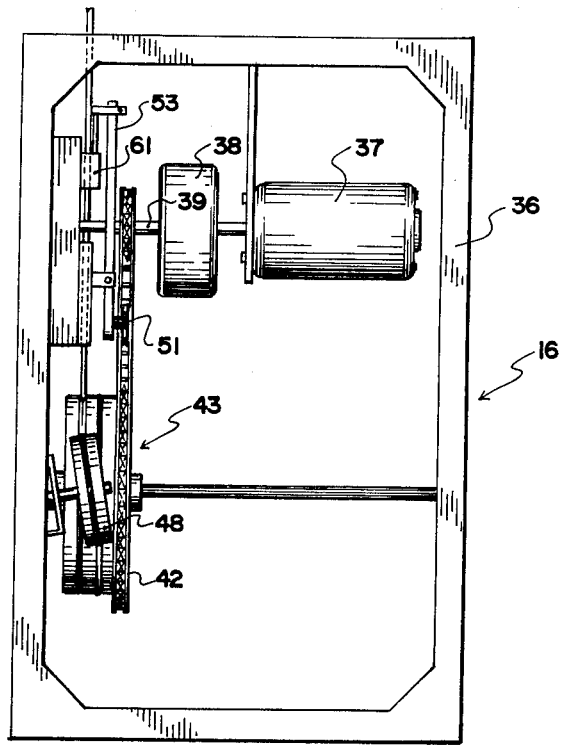
FIG. 11 is a partially schematic end view of the drive unit per se.
Figure 13:
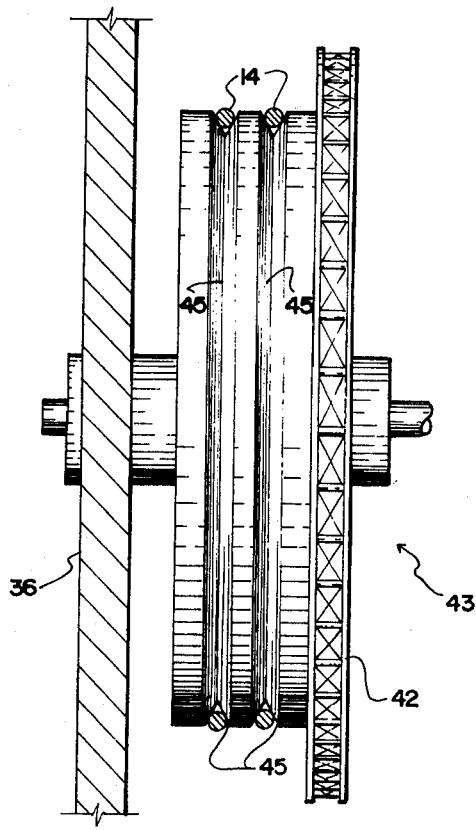
FIG. 13 is an end elevation of the drive pulley assembly per se.
Figure 12:
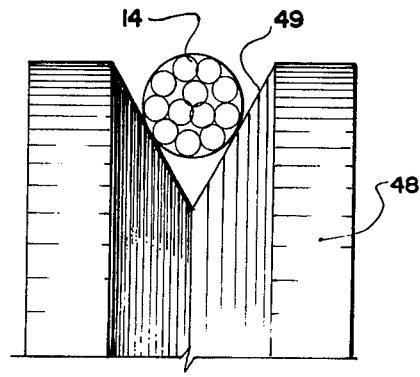
FIG. 12 is an enlarged fragmentary view of the cable and groove relationship of the drive or idler pulley assemblies.

Means are provided to switch off the motor or disconnect the motor 37 if an obstruction is engaged by the scraper assembly or when the scraper assembly reaches either end of its travel, and although various means may be utilized, it is believed the construction shown in FIG. 9 is the most desirable.

It will be noted that the endless drive chain 41 engages a pair of idler sprockets 51 journalled for rotation upon spindle 52 situated within the ends of rock bars 53 which in turn are pivoted intermediate the ends upon pivots 54 supported within the framework of the drive unit.

Rods 55 slide through blocks or brackets 56 and are connected to the bars 53 with compression springs 57 reacting between the bars 53 and the brackets 56. This exerts a pre-determined pressure upon the sprockets 51 and deflects the chain 41 as clearly shown in FIG. 9.

An actuating rod 58 is pivotally connected to the other ends of the bars 53 and is provided with adjustable stops 59 along the length thereof engaging an actuating rod 60 of a main switch 61 which controls the power to the motor 37.

The motor 37 which is a reversible motor, is adapted to drive the drive pulley assembly 43 either in the direction of arrow 62 or in the opposite direction. Assuming that it is rotating in the direction of arrow 62, tension exists on the run 41A of the chain 41 so that if an obstruction is engaged by the scraper component or it reaches the end of travel, the tension in this run 41A increases thus tending to straighten out this portion of the chain and moving the idler sprocket 51 in an arc substantially in the direction of arrow 63.

This moves rod 58 so that one of the stops 59 engages the switch lever 60 and cuts off the motor 37.

If, on the other hand, the drive pulley assembly 43 is rotating in a direction opposite to arrow 62, then the opposite chain run 41B is under tension and once again if an obstruction is engaged or the end of the travel is reached, tension increases in this run 41B thus once again actuating the rod 58 and switching off motor 37 by means of switch 61.

The tension in spring 57 is adjusted by moving the bracket 56 relative to its mounting plate 64.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A scraper system for barns or pit floors and the like comprising in combination a scraper assembly, and means for operatively connecting said scraper assembly to a source of power to move said scraper assembly back and forth across said floor, said scraper assembly including a hitch component, a frame extending outwardly on each side of said hitch component and a scraper blade component hingedly mounted to said frame and means to mount said scraper blade component for free-floating vertical movement relative to said frame, within limits, said scraper blade component including at least two scraper blades on each side of said hitch operatively connected to said frame, said two scraper blades being attached to said frame with adjacent ends overlapping one another, and means connecting said ends together for free-floating independent vertical movement within limits one relative to the other and each relative to said frame.

2. The system according to claim 1 in which the width of said frame and said scraper blade component is adjustable within limits.

3. The system according to claim 1 which includes means to move said scraper assembly in one direction in a scraping mode and in the other direction in a non-scraping mode.

4. The system according to claim 2 which includes means to move said scraper assembly in one direction in a scraping mode and in the other direction in a non-scraping mode.

5. The system according to claim 3 in which said means to move said scraper assembly in one direction in a scraping mode and the other direction in a non-scraping mode includes a cam component pivotally mounted to each scraper blade component and at the rear thereof, the leading edge of said cam being slightly lower than the underside edge of said scraper blade component whereby said cam is in free trailing relationship relative to said scraper component when same is travelling in the scraping mode, said cam engaging the floor and pivoting said scraper blade component clear of the floor when same is travelling in the non-scraping mode.

6. The system according to claim 4 in which said means to move said scraper assembly in one direction in a scraping mode and the other direction in a non-scraping mode includes a cam component pivotally mounted to each scraper blade component and at the rear thereof, the leading edge of said cam being slightly lower than the underside edge of said scraper blade component whereby said cam is in free trailing relationship relative to said scraper component when same is travelling in the scraping mode, said cam engaging the floor and pivoting said scraper blade component clear of the floor when same is travelling in the non-scraping mode.

7. The system according to claim 21 further comprising a source of power for said scraper assembly, said source of power including a motor for driving said scraper assembly, a drive pulley assembly and an idler pulley assembly and a cable operatively extending around said pulley assemblies, one end of said cable being connected to one end of said hitch to move said scraper assembly in one direction, the other end of said cable being connected to the other end of said hitch to move said scraper assembly in the other direction.

8. The invention according to claim 7 in which said pulley assembly is provided with a resilient nonmetalic surface and having cable receiving grooves formed around the periphery thereof to route said cable therearound, the plane of said idler pulley assembly being angled with respect to the plane of said drive pulley assembly thereby reducing the frictional binding between said cable passing therearound and the sides of said grooves.

9. The invention according to claim 7 which includes a chain sprocket on said drive pulley, a chain extending therearound and being operatively connected to said motor, means to disconnect said motor from said drive pulley assembly when a predetermined load on said chain is exceeded, said last mentioned means including a pair of idler pulley assemblies, one on each side of said chain, spring mounted means mounting said idler pulley assemblies against said side runs of said chain, a switch for starting and stopping said motor and means operatively connected between said idler sprocket assemblies for actuating said switch if the said predetermined load on said chain is exceeded.

10. A scraper assembly for barns or pit floors or the like comprising in combination a hitch component, a frame extending outwardly on each side of said hitch component and a scraper blade component hingedly mounted to said frame and means to mount said scraper blade component for free floating vertical movement relative to said frame within limits, said scraper blade component including at least two scraper blades on each side of said hitch operatively connected to said frame, said two scraper blades being attached to said frame with adjacent ends overlapping one another, and means connecting said ends together for free-floating independent vertical movement within limits one relative to the other and each relative to said frame.

11. The scraper blade assembly according to claim 10 in which the length of said frame and said scraper blade component is adjustable within limits.

12. The scraper blade assembly according to claim 10 which includes means to move said scraper assembly in one direction in a scraping mode and in the other direction in a non-scraping mode.

13. The scraper blade assembly according to claim 12 in which said means to move said scraper assembly in one direction in a scraping mode and the other direction in a non-scraping mode includes a cam component pivotally mounted to each scraper blade component and at the rear thereof, the leading edge of said cam being slightly lower than the underside edge of said scraper blade component whereby said cam is in free trailing relationship relative to said scraper component when same is travelling in the scraping mode, said cam engaging the floor and pivoting said scraper blade component clear of the floor when same is travelling in the non-scraping mode.

* * * * *